United States Patent [19]

Wisman

[11] 4,363,089

[45] Dec. 7, 1982

[54] INVERTER

[75] Inventor: Franklin D. Wisman, Chambersburg, Pa.

[73] Assignee: T. B. Wood's Sons Company, Chambersburg, Pa.

[21] Appl. No.: 198,399

[22] Filed: Oct. 20, 1980

Related U.S. Application Data

[63] Continuation-in-part of Ser. No. 93,559, Nov. 13, 1979, abandoned.

[51] Int. Cl.$^3$ .............................................. H02M 7/515

[52] U.S. Cl. .................................... 363/137; 318/801; 318/807

[58] Field of Search ................................ 318/801-803, 318/807, 809-812; 363/57, 58, 136-138, 160

[56] References Cited

U.S. PATENT DOCUMENTS 3,701,939 10/1972 Petersen et al. .................... 363/136
3,769,555 10/1973 Dolbachian et al. .
4,143,308 3/1979 Deplante et al. .
4,164,697 8/1979 Everett .
4,214,196 7/1980 Boyce .

FOREIGN PATENT DOCUMENTS 969878 9/1964 United Kingdom ................ 363/138
1341566 12/1973 United Kingdom .
1346153 2/1974 United Kingdom .

*Primary Examiner*—William M. Shoop
*Attorney, Agent, or Firm*—Pollock, Vande Sande & Priddy

[57] ABSTRACT

A self-commutating inverter supplies controllable frequency power to a load. The load, which may be a simple induction motor or the like, has plural load windings which may be arranged in two groups so that a load winding in one group has a complementary load winding in another. Thyristors are associated with each of the complemented load windings and the thyristors of each group of load windings are capacitively coupled. A DC potential is applied to the inverter by a pair of terminals. As different thyristors are enabled, current is commutated from one load winding to another. Excessive voltages induced by commutating the inductive loads are reduced by unidirectionally conducting devices coupled between a terminal and a divided load winding. For producing three phase power of controlled frequency, the load has six windings, forming two groups of three windings each. The thyristors associated with each group of windings conduct periodically in a sequence, with each thyristor conducting for one third (or 120°) of the period. While the conduction periods for each of the groups of load windings are equal, they are offset in time by one-sixth (or 60°) of the period.

8 Claims, 11 Drawing Figures

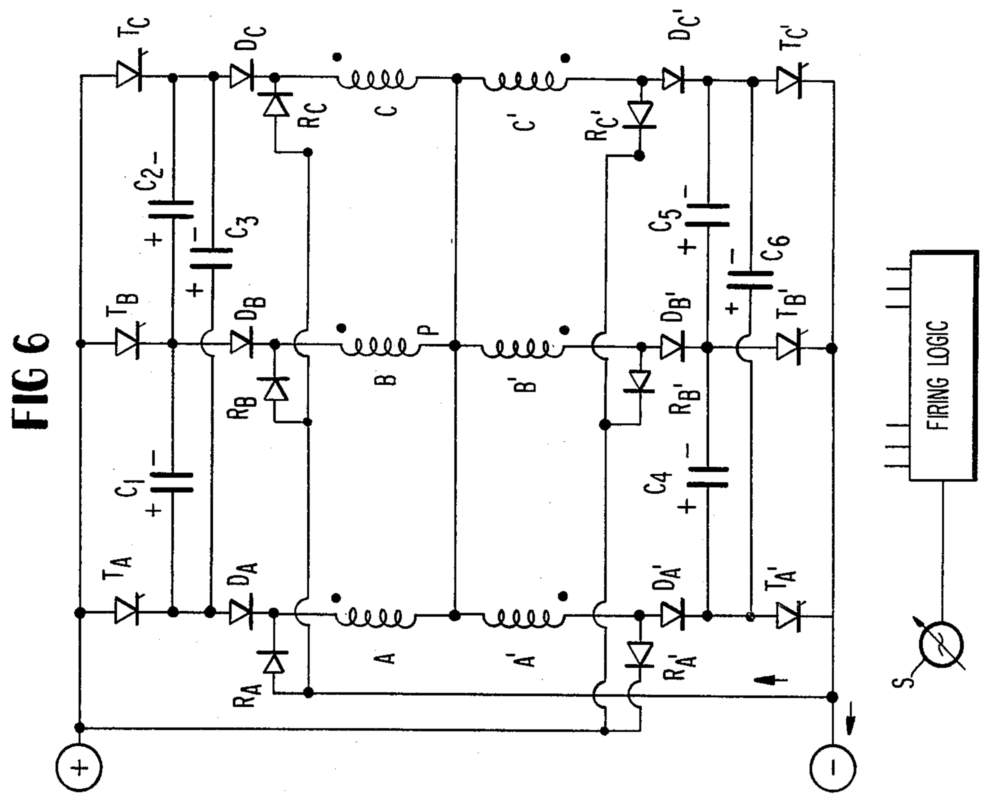
FIG 6
FIRING LOGIC
S
P
A
A'
B
B'
C
C'
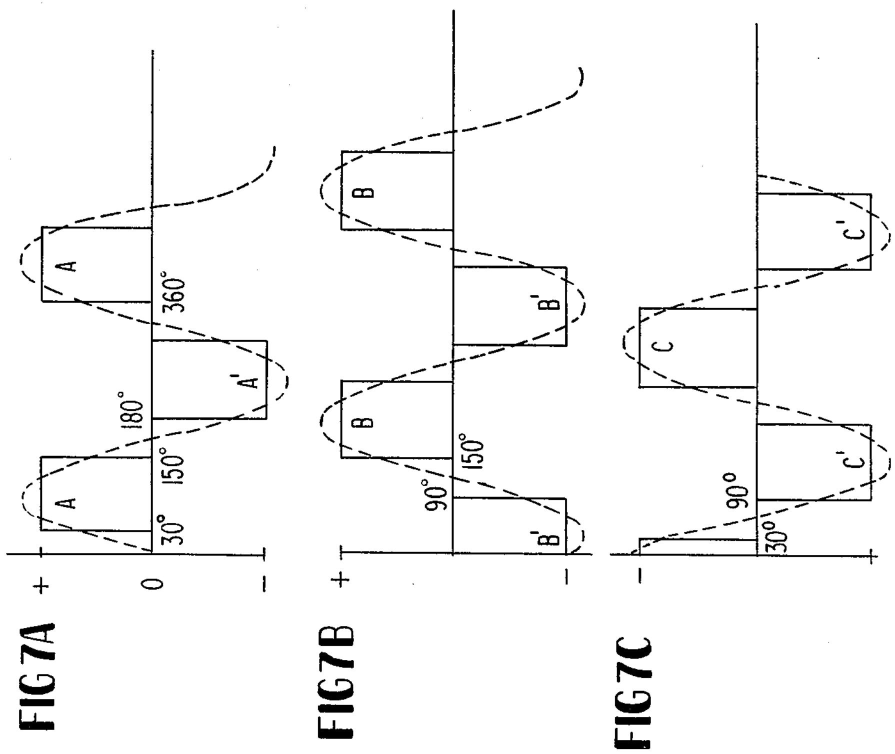
FIG 7A
FIG 7B
FIG 7C
30°
90°
150°
180°
360°

INVERTER

REFERENCE TO COPENDING APPLICATION

This application is a continuation-in-part of my prior copending application Ser. No. 93,559 filed Nov. 13, 1979, and now abandoned.

FIELD OF THE INVENTION

The present invention relates to the conversion of electrical energy from DC to an adjustable frequency.

BACKGROUND OF THE INVENTION

Devices for converting the frequency of electrical power are known in the art. One class of devices to perform this function are inverters, which convert DC energy to AC electrical energy. To enable the device to convert power from one frequency to an adjustable or controllable frequency, a rectifier is added to the inverter so as to first convert the applied power to direct current, and then employing the inverter, produce power of controllable frequency. The present invention relates to improvements in inverters.

FIG. 1 illustrates a typical prior art inverter which is supplied by direct current, and which, for producing three-phase power of controllable frequency, employs six thyristors. An inverter of the sort shown in FIG. 1 produces a six-step approximation to a three-phase sinusoidal voltage. The thyristors associated with each phase of the phases A,B and C, alternately connect the phase to either the positive or negative supply potential as determined by the firing logic (not illustrated). Also omitted from FIG. 1 are the commutation provisions for momentarily reversing current flow through the thyristor which is necessary to quench its conduction for turn-off. Turn-off, or commutation, is an essential provision in inverters of the type shown in FIG. 1, for, if turn-off fails to occur, for example, at $T_a$, prior to turn-on of the complementary element $T'_{a'}$ a direct short circuit across the supply results. This phenomenon is referred to as "short through." Practical examples of an inverter of the type shown in FIG. 1 are found in "Solid-State Adjustable Frequency AC Drives" by P. G. Mesniaeff, appearing in *Control Engineering*, November 1971, page 57 et seq; see in particular page 66 and U.S. Pat. Nos. 3,639,819 and 3,781,641.

FIG. 2 illustrates a prior art arrangement for precluding short-through. This is accomplished by dividing the load windings (FIG. 2 shows only a single divided load winding) into two windings A and A', and connecting them for alternate energizaiton by their respective thyristors $T_a$ and $T'_a$. Each winding is energized on only a half-wave basis, and in the event a thyristor fails to quench or turn-off, the impedance of the load winding remains effective for limiting the current and its rate of rise to moderate levels as compared to the short-through produced by FIG. 1, in the case of failure of a thyristor to turn-off. Furthermore, FIG. 2 illustrates the commutation provision, by illustrating the capacitor C, and the two steering or isolation diodes $D_a$ and $D'_a$.

The operation of FIG. 2 is simply explained; when $T_a$ is conducting, the left-hand terminal of the capacitor is effectively joined to the negative supply potential but because the load winding is inductively coupled to the load, and oppositely poled, the diode $D'_a$ will be at twice the positive supply potential. The diode conducts and this double charge is trapped in the capacitor C. To commutate the current form load winding A to load winding A', it is necessary only to enable the thyrisistor $T'_a$ by pulsing its gate electrode. The trapped capacitor charge momentarily supplies the load current traversing the winding A, also draining off the internal junction charge within $T_a$ allowing it to turn-off and conduction to shift to $T'_{a'}$ and load winding A'. This results in the diode $D_a$ being elevated to twice the supply potential, and the capacitor charges in the opposite direction, ready for the next commutation from $T'_a$ to $T_a$. The conduction pattern, and the sine wave approximation is shown in FIG. 3. Practical examples of inverters including divided load windings can be found in Hubner U.S. Pat. No. 3,887,859 and Greenwell U.S. Pat. No. 3,753,062; Graham, in U.S. Pat. No. 3,624,472, shows a similar arrangement in a cyclo-converter.

The prior art also includes arrangements in which the winding of a polyphase load, for example, a motor, are interconnected so that two load windings and their associated thyristors are always in series. Such an arrangement is shown in FIG. 4, for example, for a two-phase load with divided or complementary windings. As shown in FIG. 4, the windings of one phase are divided and are illustrated as windings A and A', associated with each of these windings a respective thyristors $T_a$ and $T'_a$. Likewise, another phase comprises the divided windings B and B' with their associated thyristors $T_b$ and $T'_b$. As illustrated in FIG. 4, any circuit path across the supply potential includes at least two windings and two thyristors. At times, an interphase reactor is inserted at a point common to all the windings, i.e., at point P. The two halves of the circuit of FIG. 4 operate essentially independently as described in connection with FIG. 2, but the consequences of a commutation failure are further diminished by virture of the serial feed and certain construction convenience advantages occur. In order to generate a two-phase output, the gating pulses for $T_b$ and $T'_b$ occur 90 electrical degrees after the corresponding gating pulses for $T_a$ and $T'_a$, as illustrated in FIG. 5. In this connection, it should be noted that the thyristors for any phase are energized periodically, and alternately in sequence. The 90° reference merely indicates that the gating pulses for one phase are delayed, with respect to the gating pulses for the other phase, by a length of time equal to one quarter (or 360 divided by 4) of the period. Hubner, U.S. Pat. No. 3,887,859, is a practical example of such an arrangement; see, in this connection, the windings 1*a* through 1*d* in the Figure of drawing.

In practice, it has been found that the construction of FIGS. 2 and 4 is subject to a difficulty which has limited its commercial applicability. The difficulty arises from the divided nature of the windings, and the unavoidable leakage inductance associated with them, separate and apart from the mutual inductance responsible for the development of the double supply voltage used to charge the capacitor C. When load current is present, energy is stored in the leakage inductance, at the time of commutation, it produces an additive voltage which tends to increase the charge on the capacitor and unless the capacitor has sufficient capability, this increase in charge can destroy the capacitor as well as apply excessive voltage stresses to semiconductor devices connected in the circuit. Greenwell, in U.S. Pat. No. 3,753,062, recognizes this problem and proposes a special winding arrangement as a solution.

Furthermore, the additive charge due to the leakage inductance increases proportional to load current without restriction. Increasing the size of the capacitor will contain the reactive energy, with a diminished voltage excursion, but this is not feasible for several reasons, one of which is economy. If the capacitor size is selected on the basis of the commutation requirements, that is to say, in practice to deliver maximum load current for about 40 microseconds, voltage overshoots of the order of 5 to 10 times supply voltage are encountered. For a nominal supply voltage of a few hundred volts, the needed semiconductor ratings and insulation stresses are increased into the kilovolt range.

The prior art has suggested suppression of these excessive voltages by use of surge clippers of various types (i.e., Greenwell's diodes 31); but in practice, the energy which they must be rated to continuously dissipate is substantial and wasteful of energy. Thus, it is one of the advantages of the present invention to avoid commutation voltage overshoot by regenerating leakage inductance stored energy to another of the load windings which are conducting. It is another object of the present invention to improve the load voltage waveform. Prior art structures such as shown in FIGS. 2 and 4 are inherently restricted to delivering a squarewave of load current over 180° or ½ the period of the conduction sequence. See, for example, FIGS. 6A and 6B of Greenwell. The inverter of the present invention closely approximates the sinusoidal waveform by developing a three-phase stepped output with 120° conduction in each phase (conduction in each load winding for ⅓ of the period of the conduction sequence). Achieving this object results in improved motor efficiency.

SUMMARY OF THE INVENTION

In one aspect, the present invention comprises an inverter for applying controllable power frequency to a load which inverter includes plural controlled thyristors which are driven at a controlled rate to deliver power of controlled frequency; the inverter more particularly comprising a direct current source including a pair of terminals, a load comprising two groups of complementary load windings with a plurality of load windings in each group, a plurality of thyristors equal in number to the number of load windings, each thyristor associated with a different one of the load windings, means for capacitively coupling thyristors associated with the load windings of each of said groups, a plurality of unidirectional conducting devices, each connected between one of said thyristors and an associated load winding, means connecting one of said terminals to all of said thyristors associated with one of said groups of load windings, means connecting another of said pair of terminals to all of said thyristors associated with another of said groups of load windings, and a plurality of second unidirectional conducting devices, each connected between a different junction of a load winding and a first unidirectional conducting device and one of said terminals.

In accordance with this aspect of the invention, the commutation voltage overshoot generated in a given load winding is clamped to the voltage level of the supply terminal opposite the associated thyristor by the second unidirectional conducting device. In this embodiment of the invention, each of the second unidirectional conducting devices (or recovery diodes) is directly connected to one of the terminals of the direct current source. This results in limiting the charge on the capacitors because of the recovery diodes clamping action. As previously mentioned, this is advantageous in limiting the voltage stress applied to the capacitors. However, this use of the recovery diode limits the charging of the capacitors since it limits the applied voltage. If the charge could be increased, smaller capacitors could be used advantageously from the standpoint of economy and higher allowable operating speeds.

Another desirable embodiment of my invention is an arrangement in which the voltage applied to the capacitor is controlled to be less than in the prior art, but at the same time, controllable to some quantity in excess of that made available by the supply voltage. This is achieved in a preferred embodiment of the invention in which an expander circuit is coupled between each terminal of the power supply and a terminal of the recovery diodes. The expander circuit includes a thyristor and a zener diode coupled to the thyristor gate. During commutation, clamping is inhibited until the zener threshold is reached. Accordingly, the capacitors can charge up to the sum of supply potential and zener threshold. When the zener threshold is reached, the diode conducts which results in conduction of the thyristor and the clamping action via the recovery diode takes place.

In a variant of this first aspect of the invention the recovery diodes and the expander circuit are employed with a three phase load which does not have divided load windings. As a consequence, in this variant the inverter connects DC available between a pair of supply terminals to polyphase AC of controllable frequency and includes first and second groups of thyristors, each group associated with a different supply terminal, means for gating the thyristors in a predetermined sequence and at a controllable frequency, interconnected polyphase load windings terminating in a plurality of load terminals, first and second groups of isolation diodes, one diode for each thyristor, isolation diodes of a first group connecting cathodes of first group thyristors each to a different load terminal and isolation diodes of second group each connecting anodes of second group thyristors each to a different load terminal, means coupling anodes of first group thyristors to one said supply terminal and second group cathodes to another said supply terminal, and recovery diode means including first and second groups of recovery diodes, one terminal of each recovery diode coupled to a load terminal for clamping energy, represented by collapsing leakage flux in a winding during commutation, to one of said supply terminals.

In accordance with the second aspect of the invention, the improved inverter comprises a three-phase power inverter comprising two groups of three load windings, a conductive connection between all of the load windings, a source of direct current, and thyristors associated with each of the load windings for controlling current flow in the associated winding, each of the thyristors coupled to one or another of a pair of terminals of said source of direct current, each of the thyristors associated with the load windings in a group conducting periodically and in sequence for one-third of an equal period, the periods offset with respect to each other by a time duration of one-sixth of the period.

In accordance with this aspect of the invention, the arrangement of the divided three-phase load windings into two serial groups of three allows improvement of the waveform by accommodating 120° (or conduction over one-third of the period) in each winding while maintaining unbroken continuity, and therefore conduction, in each group of three as required for a serial power feed of the two groups.

BRIEF DESCRIPTION OF THE DRAWINGS

The present invention will now be described in further detail so as to enable those of ordinary skill in the art to practice the same, in the following portions of the specification when taken in conjunction with the attached drawings in which:

FIG. 6 is a schematic of one embodiment of the inventive inverter;

FIGS. 7A, 7B and 7C are waveforms which illustrate the timing and sequence of conduction of the various thyristors in the circuit of FIG. 6;

Referring to FIG. 6, an adjustable frequency power inverter is illustrated supplying power to a polyphase load represented by the windings A, A', B,B', C and C'. These represent divided load windings in a polyphase motor or transformer primary. As shown by the dot convention, the sense of the windings A and A' are opposed when traversed by current through their associated thyristors $T_{a'}$ $T'_{a'}$ etc. A thyristor is associated with each of the load windings. The windings are divided into two groups, each comprising a winding from each phase with the two groups serially connected at the common junction point P.

FIGS. 7A, 7B and 7C respectively illustrate the conduction of the associated thyristors $T_a$ through $T'_c$. Shown dotted in each of FIGS. 7A through 7C is the sine wave approximated by the conduction sequence illustrated therein. The logic necessary to enable the various thyristors is represented by the controllable oscillator S coupled to the firing logic. The details of the logic are conventional and therefore not disclosed herein. Suffice it to say that typical firing logic is driven by signals derived from a waveform with frequency which is the desired frequency for the output power, and gate pulses are derived therefrom to cause the respective thyristors to conduct. As will become apparent as this description proceeds, the gate pulse for each thyristor is coextensive with the conduction period and therefore FIGS. 7A-7C show not only conduction as a function of time, but also represent the gate pulses delivered to the control terminal. An example of such logic is found in Dewan U.S. Pat. No. 4,024,444, see FIG. 3. However, it should also be apparent that the thyristors need not be gated for their entire conduction period. Once the inverter is operating a thyristor gate pulse need only be so long as that necessary for commutation. Start-up, however, imposes further requirements. As indicated in FIGS. 7A-7C, $T_2$ is gated on 30° from a reference time, but it is not until 90° from the same time that $T'_c$ is gated on. Since $T_a$ will not actually conduct current until $T'_c$ is also gated on, the initial gate pulse to $T_a$ must be long enough to span this 60° gap so that both $T_a$ and $T'_c$ receive gating signals simultaneously. For example, the gate pulse on $T_a$ should extend from 30° to 90°, say 70°, as a minimum, which is less than the 120° shown in FIG. 7A. It should be noted, in reviewing FIGS. 7A through 7C that the thyristors associated with any winding conduct only for 120 electrical degrees, or in other terms, one-third of the period of the conduction sequence. Of the two groups of windings A–C and A'–C', the thyristors associated with each group conduct in sequence, one thyristor being initiated into conduction when another thyristor in the same group terminates conduction. A similar conduction sequence is employed for the other group of thyristors, and the conduction sequence for both groups extends over an equal period of time. However, the time periods over which the conduction sequence takes place for the two groups is displaced or offset by 60 electrical degrees of 1/6th of either of the conduction sequence periods. For example, as shown in FIGS. 7A through 7C, these thyristors conduct in the sequence A-B-C, and the sequence is repeating. Likewise the thyristors A'-B'-C' also conduct in that sequence, and the sequence is likewise repeating. However, the time difference between the conduction of any thyristor in one group, for example, $T_{a'}$ and the next conduction of a thyristor in the other group, for example $T'_c$ is offset by 60 electrical degrees or 1/6th of the period of conduction sequence.

Figure 2:
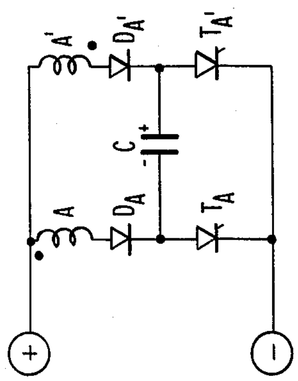
FIGS. 1, 2, and 4 are schematics illustrating principles of prior art inverters.
Figure 3:
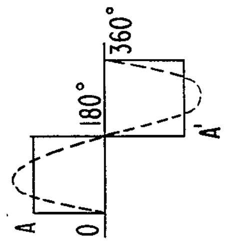
FIGS. 3 and 5 are waveforms useful in defining the conduction sequence of the various thyristors shown in FIGS. 2 and 4, respectively.
Figure 4:
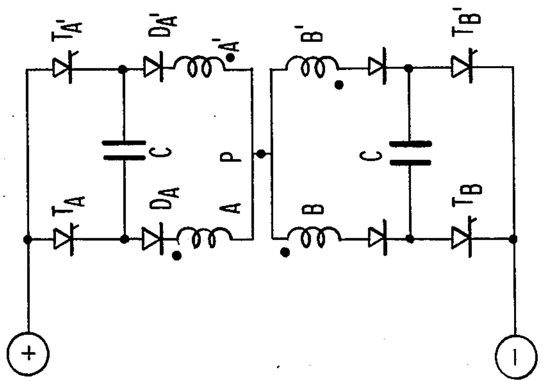
Figure 1:
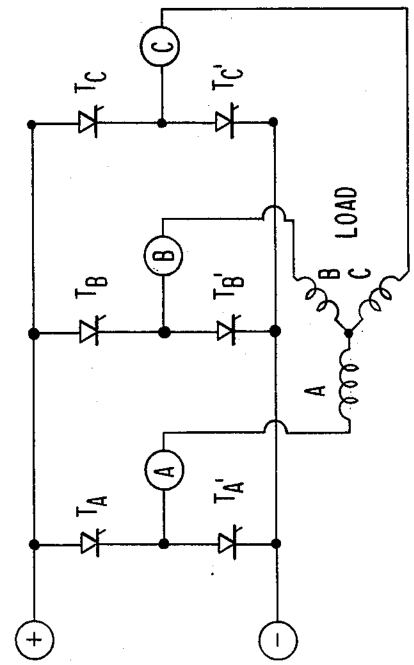

Each of the thyristors is coupled to one terminal of a DC source, anodes of the thyristors $T_{a'}T_b$ and $T_c$ are connected to a positive terminal, whereas the cathodes of thyristors $T'_aT'_b$ and $T'_c$ are connected to a negative terminal. The thyristors in each group are capacitively coupled, thyristors $T_a$ and $T_b$ are coupled by a capacitor $C_{1'}$ thyristors $T_b$ and $T_c$ are interconnected by a capacitor $C_2$, and thyristors $T_a$ and $T_c$ are coupled by a capacitor $C_3$. Likewise, capacitors $C_4$, $C_5$ and $C_6$ couple thyristors $T'_aT'_b$ and $T'_c$. Steering diodes $D_a$–$D_c$ and $D'_a$–$D'_c$ connect each thyristor to its associated load winding. In addition, recovery diodes R, one for each load winding, couple one terminal of the associated load winding to one terminal of the DC source for recovery of the leakage inductance stored energy, as will be explained below.

In operation, assume that the supply voltage is initially impressed upon the circuit, gate drive is absent from each of the thyristors, and all capacitors are discharged. Upon the application of gate drive, assume that $T_a$ is the first thyristor to receive a gating pulse (30° from an arbitrary reference); the following operation occurs. Since no other thyristor is enabled, the gating on of $T_a$ will not produce current flow. However, when $T'_c$ is enabled (at 90° from the same reference) current flow is established through windings A and C'. At this point, $D_a$ is at the positive potential and $D'_c$ is at the negative potential. The capacitors $C_1$–$C_3$ are charged. $C_3$ charges through a circuit including $T_a$ $C_{3'}D_{c'}$ winding C, winding C', $D'_c$ and $T'_c$. Capacitors $C_1$ and $C_2$ are charged to the supply potential in an oscillation circuit with winding B which is coupled via mutual inductance to the energized windings A and C'. A similar process causes the charging of capacitors $C_4$ through $C_6$ so that all capacitors have charged to the supply voltage at the time that $T_a$ is gated off and $T_b$ is gated on, at T=150°. Capacitor C1 is charged with its left hand terminal positive and its right hand terminal negative. When $T_b$ and the capacitor $C_1$ in A is diverted through $T_b$ and the capacitor $C_1$ reverse biases $T_a$ allowing it to turn off while the capacitor is discharging. When $T_a$ recovers its blocking capability, i.e., when current ceases, load current has been transferred to capacitor $C_1$, and because the winding A has substantial energy stored in its leakage inductance, it will tend to deliver this energy into the capacitors by maintaining current through $D_a$. As was mentioned in connection with the prior art, this voltage charge in the capacitors would tend to reach several times the supply voltage. It is an important aspect of the present invention that this voltage excursion generated by the collapse of leakage flux is clamped to the supply voltage through one of the recovery diodes, in this case $R_a$. Thus, because of the presence of $R_a$ the current decay transient is shifted to the supply terminal when the left hand terminal of capacitors $C_1$ and $C_3$ have reached the potential of the associated supply terminal. The capacitors are now charged to supply potential ready for subsequent commutation of current from windings B to C. By the same process, the capacitors serving the lower winding group are charged ready for the commutation from C′ to A′. The inductive energy recovery current, carried by the recovery diodes R, is delivered to the opposite polarity supply terminal and may be viewed as transferred either to the instantaneously conducting opposite group winding or as being returned to the source. This is achieved with very little loss to be dissipated as heat.

In a test with a typical motor operating at 1.6 horsepower loading and a frequency of 63.1 Hz, the average current in one winding was 4.5 amps and the current in the recovery diode was 0.72 amps or 16%. Under no-load conditions, the values are 2.7 and 1.55 amps, respectively, with a DC supply bus at 165 volts. Under no-load, the total energy being regenerated is $3\times1.55\times165=759$ watts. If this energy were being dissipated in a surge clipping device, the heating would be substantial. In addition, the influence on overall energy conversion efficiency would be devastating when one considers that the useful motor output, to the load, is 1.6 hp.$\times$746 watts/hp.$=$1911 watts. Accordingly, the recovery diodes, and the arrangement of load windings, result in inductive energy recovery, eliminating the uncontrolled voltage stress shortcomings of the prior art with excellent economy of energy, and with the addition of relatively simple components.

Figure 5:
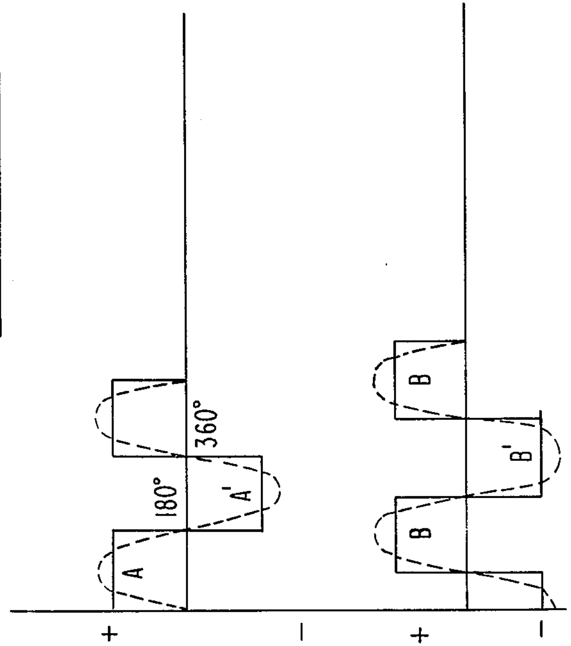

To compare the advantages of the conduction pattern of FIGS. 7A through 7C to that shown, for example, in FIG. 5, tests were conducted with identical motor frames wound for the conduction pattern of FIGS. 7A through 7C and also for the conduction pattern shown in FIG. 5. In order to isolate the advantages of the conduction pattern, the second motor was tested with recovery diodes added in accordance with the teachings of FIG. 6. The division of a two-phase load into two serial groups inherently imposes a 180° conduction pattern in order to maintain current continuity. That is, for example, with only two phases, each phase must conduct for 180°, otherwise conduction terminates. The test results, shown in Table I, accordingly illustrate the benefits of the 120° conduction vs. 180° conduction, resulting in reduced harmonics and improved motor operation.

TABLE I

| Criteria | 180° Conduction | 120° Conduction |
|---|---|---|
| Maximum torque capability inch/lbs. | 57.5 | 75 |
| Nominal ratable torque (2/3 maximum) inch/lbs. | 37.5 | 50 |
| Efficiency at ratable torque loading | 37.2% | 54.4% |
| Loss, watts at ratable torque loading | 609.5 | 450.2 |

The energy efficiency figures are overall efficiency from the 60 Hz. source to the motor shaft, and include an initial conversion from 60 Hz to DC. Since the initial conversion is common to both the 120° and 180° examples, it should not bias the comparison. Both tests were conducted with the power frequency at 30 Hz. with volts/Hz. optimally adjusted in each instance.

Figure 8:
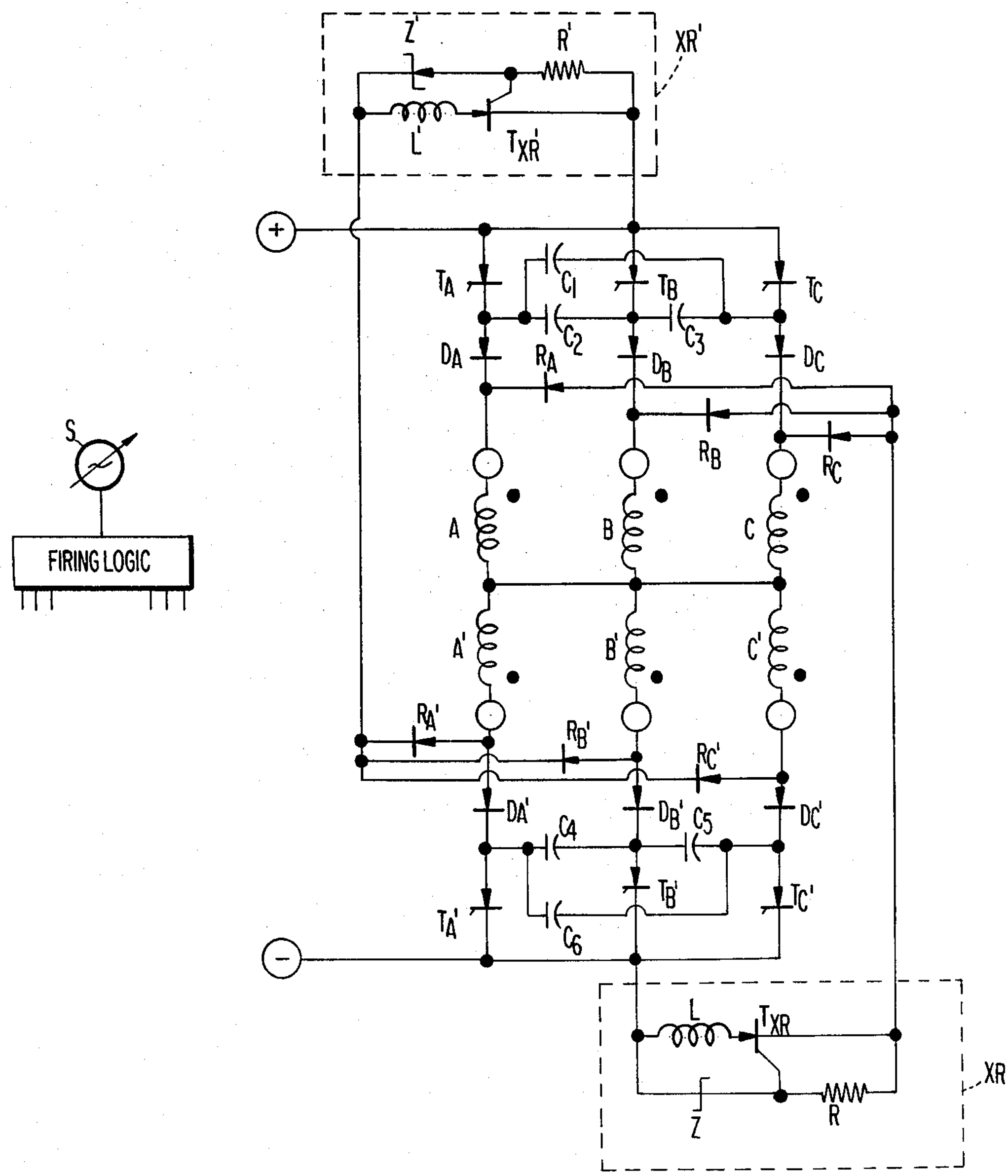
FIG. 8 illustrates a preferred embodiment of FIG. 6 which incorporates the expander circuit.

A preferred embodiment of the invention is illustrated in FIG. 8. FIG. 8 is identical to FIG. 6 with the exception that the anodes of diodes $R_a$, $R_b$ and $R_c$ are not directly connected to the − supply; rather, the anodes are connected to the − terminal through an expander circuit XR. In a similar manner, the cathodes of diodes $R'_a$, $R'_b$, and $R'_c$, are connected to the + supply by the expander circuit XR′. Each of the expander circuits includes a pair of series circuits connecting supply terminal to recovery diode. A first series circuit includes a thyristor $T_{XR}$ and an inductor L arranged to limit the current growth in $T_{XR}$ to within its di/dt rating. The second series circuit includes a voltage level establishing device which blocks current up to a predetermined voltage level and then allows conduction, such as the zener diode Z, and a resistor R. In operation, when commutation is occurring, as for example in turning off $T_{a'}$ the current in winding A is diverted first to the capacitors $C_1$·$C_2$ and $C_3$. In the embodiment of FIG. 6, the capacitor voltage is clamped to the power terminal level by action of the diode $R_a$. In this preferred embodiment the clamping action is deferred until the capacitor voltage has reached a greater level determined by the offset device represented by the zener diode Z.

The offset device Z is characterized by being nonconductive up to a definite voltage level and then going abruptly into conduction with small increment of further applied voltage. This conduction, when it arises, is applied to the gate electrode of the thyristor $T_{XR}$ and its shunt resistor R. Thyristor $T_{XR}$, which was initially non-conducting, is turned on to clamp winding A voltage to the level of the power terminal, thereby terminating charging of the capacitors. The diode $D_a$ isolates the capacitors, trapping the increased voltage therein, ready to effect the next commutation. The remainder of the inductive energy in winding A is then returned to the power terminal as in the previously described embodiments.

The resistor R affords threshold loading for the offset device Z and may, in some instances, be incorporated within the gate structure of the thyristor $T_{XR}$ as is understood by those skilled in the art.

The entire operation goes forward without energy loss or dissipation other than the insignificant forward voltage drop in $T_{XR}$ while conducting the residue of the inductive energy remaining after the capacitors have been charged to an enhanced level for effective low speed commutation. That voltage level and its stresses cannot exceed supply voltage by more than the value established by the offset device Z. It should be apparent that the use of recovery diodes R is not limited to three phase inverters and the divided three phase arrangement of FIG. 6 or 8 need not employ the recovery diodes.

Figure 9:
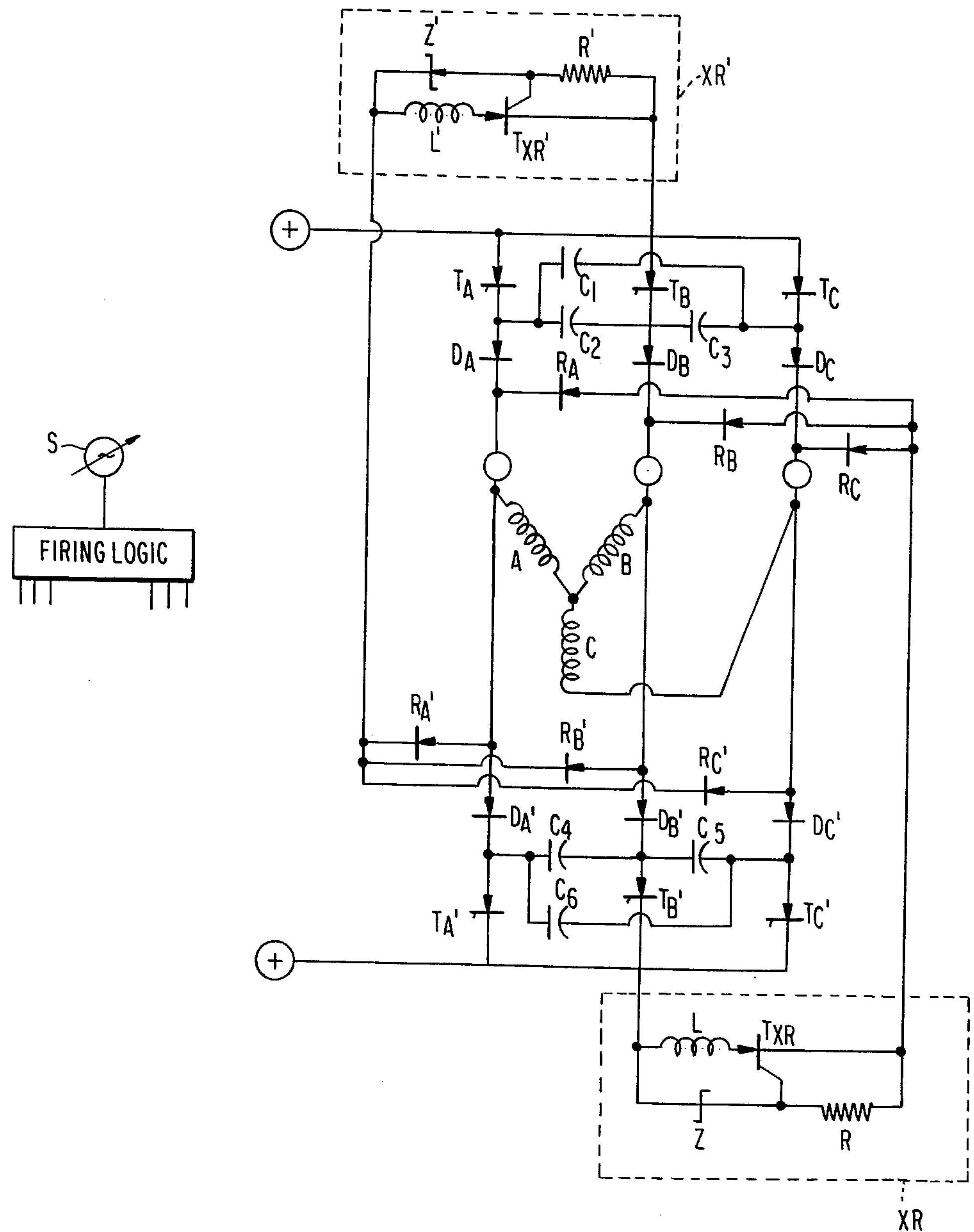
FIG. 9 illustrates an embodiment without divided load windings.

FIG. 9 is identical to FIG. 8 except that the windings A—A′ have been replaced with the single winding A. Likewise, the windings B—B′ and C—C′ have been replaced by the windings B and C, respectively. Whereas in FIG. 8 current flowed in winding A only when $T_a$ was on, now current, of one polarity or another, will flow in winding A if $T_a$ or $T'_a$ is on. In other respects the circuit of FIG. 9 operates in the same manner as the circuit of FIG. 8.

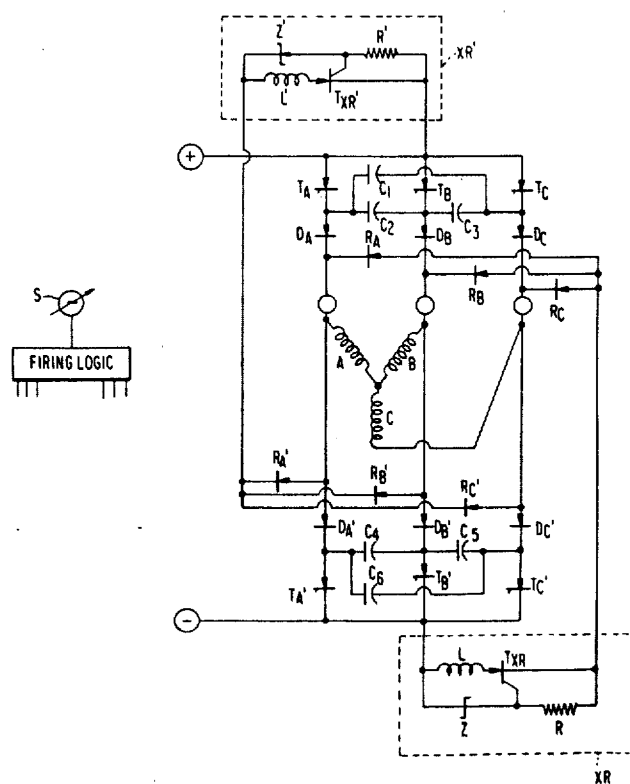

What is claimed is:

1. An inverter for converting DC available between a pair of terminals to three-phase AC of controllable frequency comprising:
first and second groups of complementary load windings,
first and second groups of thyristors, each associated with a different load winding,
means for gating said thyristors in a predetermined sequence and at a controllable frequency,
first and second groups of isolation diodes, one isolation diode for each load winding, isolation diodes of a first group connecting cathodes of first group thyristors to an associated load winding and isolation diodes of said second group connecting anodes of second group thyristors to an associated load winding,
means coupling anode-cathode circuits of all said thyristors to one or another of said terminals, said means coupling anodes of first group thyristors to one of said terminal and second group cathodes to another said terminal,
recovery diode means including first and second groups of recovery diodes, each recovery diode associated with a different load winding and coupled therewith for clamping energy represented by collapsing leakage flux in a winding during commutation to one or another of said terminals, said recovery diode means including a pair of expander circuits, one associated with each said terminal, each expander circuit coupled between said associated terminal and the terminal common to a group of said recovery diodes for inhibiting clamping until a predetermined voltage level is attained.

2. The apparatus of claim 1 wherein each said expander circuit includes
a first series circuit including a thyristor coupled between one of said terminals and said common terminal,
a second series circuit connected in parallel with said first series circuit, said second series circuit including a voltage level establishing means for blocking current conduction in said second series circuit until a predetermined voltage level is attained and for then conducting current, and means coupling said voltage level establishing means to a gate electrode of said first series circuit thyristor.

3. The apparatus of claim 2 in which said voltage level establishing means is a zener diode.

4. The apparatus of claim 2 in which said first series circuit includes an inductor for controlling rate of current increase in said first series circuit.

5. An inverter for converting DC available between a pair of supply terminals to polyphase AC of controllable frequency comprising:
first and second groups of thyristors, each group associated with a different supply terminal,
means for gating said thyristors in a predetermined sequence and at a controllable frequency,
interconnected polyphase load windings terminating in a plurality of load terminals,
first and second groups of isolation diodes, one isolation diode for each thyristor, isolation diodes of a first group connecting cathodes of first group thyristors each to a different load terminal and isolation diodes of second group each connecting anodes of second group thyristors each to a different load terminal,
means coupling anodes of first group thyristors to one said supply terminal and second group cathodes to another said supply terminal,
and recovery diode means including first and second groups of recovery diodes, one terminal of each recovery diode coupled to a load terminal, for clamping energy, represented by collapsing leakage flux in a winding during commutation, to one of said supply terminals, said recovery diode means including a pair of expander circuits coupled between the associated supply terminal and a terminal common to group of recovery diodes for inhibiting said clamping until a predetermined voltage level is attained.

6. The apparatus of claim 5 wherein each said expander circuit includes
a first series circuit, including a thyristor, coupled between one of said supply terminals and said common terminal,
a second series circuit connected in parallel with said first series circuit, said second series circuit including a voltage level establishing means for blocking current conduction in said second series circuit until a predetermined voltage level is attained and for then conducting current, and means conductively connecting said voltage level establishing means to a gate electrode of said first series circuit thyristor.

7. The apparatus of claim 6 wherein said voltage level establishing means is a zener diode.

8. The apparatus of claim 6 in which said first series circuit includes an inductor.

* * * * *

UNITED STATES PATENT AND TRADEMARK OFFICE

CERTIFICATE OF CORRECTION

PATENT NO. : 4,363,089

DATED : December 7, 1982

INVENTOR(S) : Franklin O. Wisman

It is certified that error appears in the above-identified patent and that said Letters Patent are hereby corrected as shown below:

Inventor: Change "Franklin D. Wisman" to -Franklin O. Wisman-.

Col. 1, line 68, change "form" to -from.

Col. 6, lines 63-65, change "When $T_b$ and the capacitor $C_1$ in A is diverted through $T_b$ and the capacitor $C_1$ reverse bias is $T_a$ allowing it to turn off while the capacitor is discharging." to -When $T_b$ is gated on, the current flowing in winding A is diverted through $T_b$, the capacitor $C_1$ reverse biasses $T_a$ allowing it to turn off while the capacitor is discharging.-

Col. 9, line 1, change "identical" to -similar-.

Figure 9: should appear as shown on the attached sheet.

Signed and Sealed this

*Twenty-ninth* Day of *March 1983*

[SEAL]

*Attest:*

GERALD J. MOSSINGHOFF

*Attesting Officer* *Commissioner of Patents and Trademarks*

UNITED STATES PATENT AND TRADEMARK OFFICE
CERTIFICATE OF CORRECTION

PATENT NO. : 4,363,089

DATED : December 7, 1982

INVENTOR(S) : Franklin O. Wisman

It is certified that error appears in the above-identified patent and that said Letters Patent is hereby corrected as shown below:

FIG 9